US012681346B2

(12) United States Patent
Kim et al.

(10) Patent No.: US 12,681,346 B2
(45) Date of Patent: Jul. 14, 2026

(54) OPTICAL DISPLAY DEVICE MODULE AND OPTICAL DISPLAY DEVICE COMPRISING SAME

(71) Applicant: SAMSUNG SDI CO., LTD., Yongin-si (KR)

(72) Inventors: Bong Choon Kim, Suwon-si (KR); Jun Mo Koo, Suwon-si (KR); Kwang Ho Shin, Suwon-si (KR); Jung Hun You, Suwon-si (KR); Sang Hum Lee, Suwon-si (KR); Eun Sol Cho, Suwon-si (KR); Seon Oh Hwang, Suwon-si (KR)

(73) Assignee: WUXI HENGXIN OPTOELECTRONICS MATERIALS CO., LTD., Wuxi (CN)

( * ) Notice: Subject to any disclaimer, the term of this patent is extended or adjusted under 35 U.S.C. 154(b) by 0 days.

(21) Appl. No.: 18/247,318

(22) PCT Filed: Oct. 7, 2021

(86) PCT No.: PCT/KR2021/013797
§ 371 (c)(1),
(2) Date: Mar. 30, 2023

(87) PCT Pub. No.: WO2022/080757
PCT Pub. Date: Apr. 21, 2022

(65) Prior Publication Data
US 2024/0004235 A1 Jan. 4, 2024

(30) Foreign Application Priority Data
Oct. 12, 2020 (KR) ........................ 10-2020-0131471

(51) Int. Cl.
*G02F 1/1335* (2006.01)
*G02F 1/13363* (2006.01)
*G02F 1/1337* (2006.01)

(52) U.S. Cl.
CPC .... *G02F 1/133531* (2021.01); *G02F 1/13363* (2013.01); *G02F 1/133746* (2021.01)

(58) Field of Classification Search
CPC .................................................. G02F 1/13363
See application file for complete search history.

(56) References Cited

U.S. PATENT DOCUMENTS

2006/0246231 A1 11/2006 Koishi et al.
2010/0085522 A1 4/2010 Uesaka et al.
(Continued)

FOREIGN PATENT DOCUMENTS

CN 101573656 A 11/2009
CN 109471303 A 3/2019
(Continued)

OTHER PUBLICATIONS

International Search Report of PCT/KR2021/013797, Jan. 14, 2022, 4 pp.
(Continued)

*Primary Examiner* — Alexander P Gross
(74) *Attorney, Agent, or Firm* — Ricky Lam

(57) ABSTRACT

Provided are an optical display device module and an optical display device comprising same, the module comprising: an optical display device panel; and a first polarizer, a first retardation layer, and a second retardation layer that are sequentially stacked, wherein the second retardation layer is disposed inside the panel for the optical display device, the slow axis of the first retardation layer forms −5° to +5° with respect to the absorption axis of the first polarizer, the slow axis of the second retardation layer forms −5° to +5° with (Continued)

```
                                              ╭──── 20
                                              ╰──── 30
      ╭  ///////////////////////////////    ──── 11
      │                                       ──── 40
  10 ╡                                        
      │                                       ──── 60
      ╰  ///////////////////////////////    ──── 12
                                              ──── 50
``` respect to the absorption axis of the first polarizer, the second retardation layer includes a positive A retardation layer of which the biaxial degree is 0.9 to 1.1 at a wavelength of 550 nm, and the first retardation layer includes a positive B retardation layer of which the biaxial degree is −1 to −0.2 at a wavelength of 550 nm.

14 Claims, 1 Drawing Sheet

(56)          References Cited

U.S. PATENT DOCUMENTS

| | | | |
|---|---|---|---|
| 2011/0051062 A1* | 3/2011 | Sakai | G02B 5/3033 |
| | | | 349/120 |
| 2015/0277012 A1 | 10/2015 | Nakamura et al. | |
| 2019/0079356 A1* | 3/2019 | Mizusaki | C09K 19/56 |
| 2019/0094593 A1* | 3/2019 | Hasegawa | G02F 1/13363 |
| 2019/0285924 A1* | 9/2019 | Koide | G02F 1/133528 |
| 2020/0285093 A1 | 9/2020 | Choi et al. | |

FOREIGN PATENT DOCUMENTS

| | | | | |
|---|---|---|---|---|
| CN | 109683375 | A | | 4/2019 |
| KR | 10-2005-0095974 | A | | 10/2005 |
| KR | 10-2006-0049143 | A | | 5/2006 |
| KR | 10-2010-0060092 | A | | 6/2010 |
| KR | 20100060092 | A | * | 6/2010 |
| KR | 10-2012-0119083 | A | | 10/2012 |
| KR | 10-2016-0059319 | A | | 5/2016 |
| KR | 10-2019-0045022 | A | | 5/2019 |

OTHER PUBLICATIONS

Korean Office Action dated Feb. 13, 2024, issued in corresponding Korean Patent Application No. 10-2020-0131471 (6 pages).
Chinese Office Action dated Jun. 28, 2025, issued in corresponding Chinese Patent Application No. 202180069149.3 (8 pages).

* cited by examiner

【FIG. 1】
【FIG. 2】
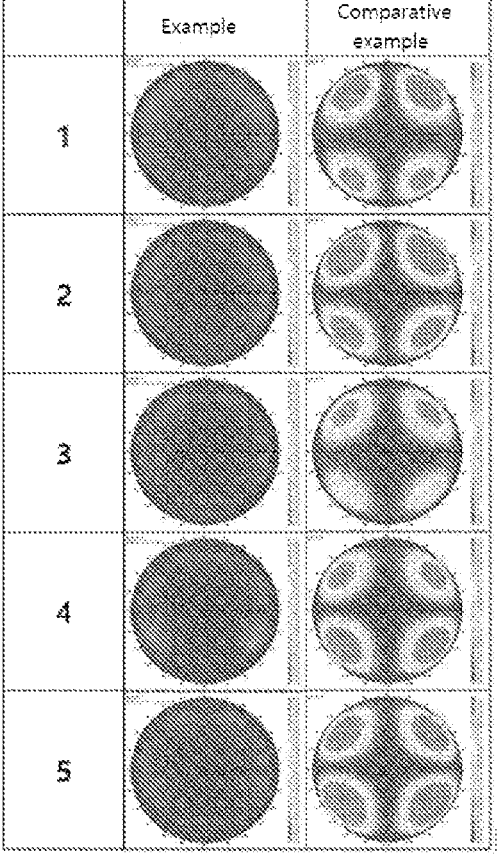

OPTICAL DISPLAY DEVICE MODULE AND OPTICAL DISPLAY DEVICE COMPRISING SAME

CROSS-REFERENCE TO RELATED APPLICATIONS

This application is a U.S. National Phase Patent Application of International Application Number PCT/KR2021/013797, filed on Oct. 7, 2021, which claims priority to Korean Patent Application Number 10-2020-0131471, filed on Oct. 12, 2020, the entire content of each of which is incorporated herein by reference.

TECHNICAL FIELD

The present invention relates to a module for an optical display and an optical display device including the same. More particularly, the present invention relates to a module for an optical display, which secures improvement in productivity, processability, economic feasibility, and compensation for wide viewing angle while minimizing generation of curls, and an optical display device including the same.

BACKGROUND ART

A liquid crystal display is composed of a liquid crystal display panel including a liquid crystal layer, and a polarizing plate stacked on each of a light exit surface and a light incidence surface of the liquid crystal display panel and including a polarizer. As the liquid crystal layer, a vertical alignment liquid crystal layer or a horizontal alignment liquid crystal layer is used. The horizontal alignment liquid crystal layer means a liquid crystal layer in which liquid crystal molecules are arranged parallel to a substrate for the liquid crystal display panel and are evenly aligned. A liquid crystal display including the horizontal alignment liquid crystal layer can realize wide viewing angle through combination of many retardation layers.

Until recent years, in the field of horizontal alignment liquid crystal displays, demand for wide viewing angle is not high due to better optical properties than other liquid crystal modes. However, with enlargement of displays to allow distribution of ultra-large domestic TVs and increasing resolution, there is increasing demand for wide viewing angle. In order to realize wide viewing angle in a horizontal alignment mode, there is a need for a retardation layer. The retardation layer may be realized in the form of a coating or a film.

A coating type retardation layer is advantageous in thickness reduction of the polarizing plate. However, it is very difficult to form a uniform retardation layer on a broad polarizing plate for large displays through coating of a composition and the coating type retardation layer requires complicated processes, such as attachment and separation of a protective film for coating of the composition, deposition, curing and drying of the composition, and the like.

A film type retardation layer requires a roll-to-roll process in order to secure processability. In order to realize broad viewing angle in the horizontal alignment mode, two retardation layers are used in the polarizing plate. However, the second retardation film is bonded to the polarizing plate in a roll state via a bonding agent. Here, there are problems to be solved, such as curls due to structural asymmetry with reference to the polarizer, introduction of foreign matter upon assembly, and the like, which cause increase in failure rate of the polarizing plate.

The background technique of the present invention is disclosed in Korean Patent Laid-open Publication No. 10-2005-0095974 and the like.

DISCLOSURE

Technical Problem

It is an aspect of the present invention to provide an optical display device that secures improvement in productivity and processability.

It is another aspect of the present invention to provide an optical display device that secures good economic feasibility and good compensation for broad viewing angle.

It is a further aspect of the present invention to provide an optical display device that secures good screen quality on an ultra-large screen.

It is yet another aspect of the present invention to provide an optical display device that minimizes generation of curls.

Technical Solution

One aspect of the present invention relates to an optical display module.

1. The optical display module includes: an optical display panel; and a first polarizer, a first retardation layer and a second retardation layer sequentially stacked, wherein the second retardation layer is disposed inside the optical display panel; a slow axis of the first retardation layer is tilted at an angle of $-5°$ to $+5°$ with respect to a light absorption axis of the first polarizer; a slow axis of the second retardation layer is tilted at an angle of $-5°$ to $+5°$ with respect to the light absorption axis of the first polarizer; the second retardation layer includes a positive A retardation layer having a degree of biaxiality (NZ) of 0.9 to 1.1 at a wavelength of 550 nm; and the first retardation layer includes a positive B retardation layer having a degree of biaxiality (NZ) of $-1$ to $-0.2$ at a wavelength of 550 nm.

2. In 1, each of the first polarizer and the first retardation layer may be disposed outside the optical display panel.

3. In 1 and 2, the slow axis of the first retardation layer may be tilted at an angle of $0°$ to $5°$ with respect to a machine direction (MD) of the first retardation layer.

4. In 1 to 3, the first retardation layer may be formed of a material having negative ($-$) birefringence.

5. In 4, the material having negative ($-$) birefringence may include at least one selected from among an acrylic based resin, a non-modified styrene based resin, a modified styrene based resin, a maleimide based resin, and a fumaric acid ester based resin.

6. In 1 to 5, the first retardation layer may include a film including the material having negative ($-$) birefringence and subjected to TD uniaxial stretching.

7. In 1 to 6, the first retardation layer may have an in-plane retardation Re of 50 nm to 110 nm at a wavelength of 550 nm.

8. In 1 to 7, the optical display module may further include an adhesive layer, a bonding layer, or an adhesive/bonding layer between the first polarizer and the first retardation layer.

9. In 1 to 8, the second retardation layer may have an in-plane retardation Re of 70 nm to 120 nm at a wavelength of 550 nm.

10. In 1 to 9, the second retardation layer may be formed of a liquid crystalline composition containing a reactive mesogen.

11. In 1 to 10, the optical display panel may further include an image display medium.

12. In 11, the image display medium may include a liquid crystal layer.

13. In 12, the slow axis of the second retardation layer may be tilted at an angle of +85° to +95° with reference to an alignment direction of liquid crystal molecules in a non-electric field state in the liquid crystal layer.

14. In 12 and 13, the alignment direction of the liquid crystal molecules in the non-electric field state in the liquid crystal layer may be tilted at an angle of +85° to +95° with reference to the light absorption axis of the first polarizer.

15. In 12 to 14, in the optical display panel, the first polarizer, the first retardation layer, the second retardation layer, and the liquid crystal layer may be sequentially formed in the stated order.

16. In 12 to 15, the liquid crystal layer may include liquid crystals in a horizontal alignment mode.

17. In 1 to 16, the optical display panel may further include a second polarizer disposed at an opposite side to the first polarizer with reference to the optical display panel, wherein a light absorption axis of the second polarizer is tilted at an angle of +85° to +95° with reference to the light absorption axis of the first polarizer.

Another aspect of the present invention relates to an optical display device.

The optical display device includes the optical display module according to the present invention.

Advantageous Effects

The present invention provides an optical display device that secures improvement in productivity and processability.

The present invention provides an optical display device that secures good economic feasibility and good compensation for broad viewing angle.

The present invention provides an optical display device that secures good screen quality in an ultra-large screen.

The present invention provides an optical display device that minimizes generation of curls.

DESCRIPTION OF DRAWINGS

FIG. 1 is a conceptual view of an optical display module according to one embodiment of the present invention.

FIG. 2 shows transmittance of Examples 1 to 5 and Comparative Examples 1 to 5 in a black mode.

BEST MODE

Hereinafter, exemplary embodiments of the present invention will be described in detail with reference to the accompanying drawings such that the present invention can be easily implemented by those skilled in the art. It should be understood that the present invention may be embodied in different ways and is not limited to the following embodiments.

In the drawings, components unrelated to description are omitted for clear description of the invention and like components will be denoted by like reference numerals throughout the specification. Although lengths, thicknesses or widths of various components may be exaggerated for understanding in the drawings, the present invention is not limited thereto.

Herein, spatially relative terms, such as "upper" and "lower", are defined with reference to the accompanying drawings. Thus, it will be understood that the term "upper surface" can be used interchangeably with the term "lower surface".

Herein, "in-plane retardation Re", "out-of-plane retardation Rth", and "degree of biaxiality NZ" are represented by Equations A, B and C, respectively:

$$Re=(nx-ny)\times d \qquad \text{[Equation A]}$$

$$Rth = ((nx + ny)/2 - nz)\times d \qquad \text{[Equation B]}$$

$$NZ = (nx - nz)/(nx - my) \qquad \text{[Equation C]}$$

where nx, ny, and nz are indexes of refraction of a corresponding optical device in a slow axis direction, a fast axis direction and a thickness direction thereof at a measurement wavelength, respectively, and d denotes a thickness of the optical device (unit: nm).

Herein, "+" means an angle in the counterclockwise direction and "−" means an angle in the clockwise direction with respect to a reference point.

As used herein to represent a specific numerical range, the expression "X to Y" means "greater than or equal to X and less than or equal to Y (X≤ and ≤Y)".

Hereinafter, an optical display module according to the present invention will be described.

The optical display module includes: an optical display panel; and a first polarizer, a first retardation layer and a second retardation layer sequentially stacked in the stated order. The second retardation layer is disposed inside the optical display panel.

In one embodiment, the first retardation layer and the first polarizer are sequentially stacked from a light exit surface of the optical display panel on the light exit surface of the optical display panel and outside the optical display panel. As a result, the first retardation layer and the first polarizer may act as a viewer-side polarizing plate of the optical display device.

The optical display module allows improvement in processability and productivity while securing good economic feasibility and good compensation for broad viewing angle. The optical display module according to the present invention secures good screen quality on an ultra-large screen. That is, the optical display module according to the present invention allows manufacture of a laminate of the first polarizer and the first retardation layer in a roll-to-roll process without a second retardation layer, thereby enabling reduction in thickness of the viewer-side polarizing plate and application to an ultra-large screen while securing improvement in productivity and processability. In addition, the optical display module according to the present invention secures good compensation for wide viewing angle by controlling optical properties and the degrees of biaxiality of the first retardation layer and the second retardation layer within specific ranges of the present invention in placement of the second retardation layer, the first retardation layer and the first polarizer in the module.

Referring to FIG. 1, an optical display module according to one embodiment of the invention will be described.

Referring to FIG. 1, the optical display module includes a first polarizer 20, a first retardation layer 30, a second retardation layer 40, an optical display panel 10, and a second polarizer 50. The second retardation layer 40 is disposed inside the optical display panel 10. The optical display module further includes a liquid crystal layer 60 inside the optical display panel 10. The first polarizer 20, the first retardation layer 30, and the second polarizer 50 are disposed outside the optical display panel 10.

First Polarizer

The first polarizer 20 is stacked on an upper surface of the optical display panel 10 (light exit surface of the optical display panel) to display an image through emission of light received from the optical display panel 10 therethrough. The first polarizer 20 converts light or polarized light emitted from the optical display panel 10 into polarized light through linear polarization.

The first polarizer 20 may include a polarizer produced from a polymer film mainly consisting of a polyvinyl alcohol based resin. Specifically, the first polarizer may be prepared by dyeing the polymer film with iodine or dichroic dyes, followed by uniaxially stretching the polymer film in the MD (machine direction). Specifically, the first polarizer may be prepared through swelling, dyeing, stretching and crosslinking of a polyvinyl alcohol based film.

The first polarizer 20 may have a thickness of 30 µm or less, specifically greater than 0 µm to 30 µm, more specifically 2 µm to 20 µm, still more specifically 4 µm to 10 µm. Within this range, the first polarizer can be used in the polarizing plate.

The first polarizer 20 has a light absorption axis and a light transmission axis. The light absorption axis of the first polarizer may correspond to the machine direction (MD) of the first polarizer and the light transmission axis of the first polarizer may correspond to the transverse direction (TD) of the first polarizer.

In the liquid crystal layer 60 of the optical display panel, liquid crystal molecules in a non-electric field state are aligned in a direction of +85° to +95°, specifically +90°, with reference to the light absorption axis (0°) of the first polarizer. Within this range, the polarizing plate can provide high front contrast to realize a clear image.

Although not shown FIG. 1, a polarizer protective film or a polarizer protective layer may be further stacked on the other side of the first retardation layer of the first polarizer 20, that is, on an upper surface of the first polarizer 20, between the first polarizer 20 and the first retardation layer 30 or between the first retardation layer 30 and the optical display panel 10. A functional coating layer, such as a hard coating layer, an antiglare layer, an anti-fingerprint layer, an antireflective layer, and the like, may be further formed on an upper surface of the protective film or the protective layer stacked on the upper surface of the first polarizer 20.

The polarizer protective film or the polarizer protective layer may be optically isotropic or anisotropic. Here, "optically isotropic" means that a corresponding film or layer has an in-plane retardation of 10 nm or less, for example, 0 nm to 10 nm, at a wavelength of 550 nm. In addition, "optically anisotropic" means that a corresponding film or layer has an in-plane retardation of greater than nm, for example, greater than 10 nm to 15,000 nm, at a wavelength of 550 nm. The polarizer protective film or the polarizer protective layer may provide an additional function to the polarizing plate through retardation according to optically isotropic or anisotropic properties.

Second Retardation Layer

The second retardation layer 40 is stacked on a lower surface of the first retardation layer 30 (light incidence surface of the first retardation layer) to provide an effect of compensation for broad viewing angle together with the first retardation layer. The effect of compensation for broad viewing angle will be described below.

The second retardation layer 40 is disposed inside the optical display panel 10. This structure allows elimination of an additional process for bonding the first retardation layer 30 to the second retardation layer 40, thereby improving productivity and processability through simplification of a process of manufacturing the polarizing plate.

The second retardation layer 40 may be formed on the upper surface of the optical display panel, that is, on the light exit surface of the optical display panel.

Although the second retardation layer 40 may be formed of a non-liquid crystalline composition, the second retardation layer 40 is preferably formed by coating a liquid crystalline composition on a lower surface of a first substrate of the optical display panel described below, followed by curing the liquid crystalline composition in consideration of a liquid crystal layer that can be formed inside the optical display panel. For example, the second retardation layer may be formed by depositing an alignment layer on the lower surface of the first substrate and coating the liquid crystalline composition on the alignment layer, followed by curing the liquid crystalline composition.

In one embodiment, the liquid crystalline composition may contain a reactive mesogen. The reactive mesogen is a reactive liquid crystal monomer having a photo-polymerizable functional group and can realize phase retardation when cured through optical alignment, physical alignment or mechanical alignment. The reactive mesogen may include a unit, such as a biphenyl group, a phenylbenzoate group, a phenylcyclohexane group, an azoxybenzene group, an azomethine group, a phenylpyrimidine group, a diphenylacetylene group, a diphenyl benzoate group, a bicyclohexane group, a cyclohexylbenzene group, a terphenyl group, and the like, as the mesogen group. These units may further include a substituent group, such as a cyano group, an alkyl group, an alkoxy group, a halogen, and the like, at terminals thereof. The liquid crystalline composition may further include a polymerizable liquid crystal monomer, a polymerizable monomer, a crosslinking agent, an initiator, and the like.

The reactive mesogen may be a typical reactive mesogen known to those skilled in the art. However, although the reactive mesogen can easily realize target retardation through alignment and curing, the reactive mesogen has a drawback of high price.

Accordingly, the second retardation layer 40 includes a positive A (+A) retardation layer having a degree of biaxiality of 0.9 to 1.1 at a wavelength of 550 nm (nx>ny≒nz, nx, ny, and nz being the indexes of refraction of the positive A retardation layer at a wavelength of 550 nm in the slow axis direction, the fast axis direction, and the thickness direction thereof, respectively). As a result, the second retardation layer can provide the effect of compensation for broad viewing angle together with the first retardation layer while securing good economic feasibility through reduction in amount of the expensive reactive mesogen. nx>ny≒nz and the degree of biaxiality may be achieved through adjustment of the material and alignment direction of the second retardation layer in formation of the second retardation layer.

Specifically, the second retardation layer may have a degree of biaxiality of 0.95 to 1.05, more specifically 0.98 to 1.03, most specifically 1, at a wavelength of 550 nm. Within this range, the second retardation layer can provide the effect of compensation for broad viewing angle and can be easily formed.

The second retardation layer 40 may have an in-plane retardation of 70 nm to 120 nm, for example, 70 nm, 75 nm, 80 nm, 85 nm, 90 nm, 95 nm, 100 nm, 105 nm, 110 nm, 115 nm, or 120 nm, specifically 70 nm to 110 nm, more specifically 70 nm to 105 nm, at a wavelength of 550 nm.

Within this range, the second retardation layer can secure compensation for broad viewing angle and thickness reduction of the optical display device while securing good economic feasibility through reduction in amount of the expensive reactive mesogen.

The second retardation layer 40 has a slow axis and a fast axis in the alignment direction thereof upon formation of the second retardation layer.

The slow axis of the second retardation layer 40 is tilted at an angle of −5° to +5° with respect to the light absorption axis (0°) of the first polarizer. Within this range, the optical display panel can secure a high front contrast ratio to realize a clear image. Specifically, the slow axis of the second retardation layer 40 may be tilted at an angle of, for example, −5°, −4°, −3°, −2°, −1°, 0°, +1°, +2°, +3°, +4°, or +5° with respect to the light absorption axis (0°) of the first polarizer and thus may be substantially parallel thereto.

The slow axis of the second retardation layer 40 may be tilted at an angle of +85° to +95°, specifically +90°, with reference to an alignment direction (0°) of liquid crystal molecules of the liquid crystal layer in a non-electric field state and thus may be substantially orthogonal thereto.

The second retardation layer 40 may have a thickness of 10 μm or less, specifically greater than 0 μm to 10 μm, or 0.5 μm to 2 μm.

First Retardation Layer

The first retardation layer 30 is interposed between the first polarizer 20 and the second retardation layer 40. The first retardation layer 30 is stacked on a lower surface of the first polarizer 20.

The first retardation layer 30 has a slow axis and a fast axis in an in-plane direction thereof.

The slow axis of the first retardation layer 30 is tilted at an angle of −5° to +5° with respect to the light absorption axis (0°) of the first polarizer 20.

The optical display module according to the present invention includes the first retardation layer and the second retardation layer to achieve compensation for broad viewing angle. The second retardation layer is disposed inside the optical display panel and the first retardation layer is disposed outside the optical display panel such that the slow axis of the first retardation layer (MD of the first retardation layer) is tilted at an angle of −5° to +5° with respect to the light absorption axis of the first polarizer (MD of the first polarizer), whereby a laminate of the first polarizer and the first retardation layer can be manufactured through bonding of the first retardation layer to the first polarizer provided in the form of a film in a roll-to-roll process without the second retardation layer, thereby enabling remarkable improvement in productivity and processability. In a method of manufacturing the laminate through roll-to-roll, each of the first polarizer and first retardation layer is released from a wound roll and a bonding agent is placed between the first polarizer and first retardation layer, followed by curing the bonding agent. Accordingly, the method of manufacturing the laminate through roll-to-roll can achieve remarkable improvement in productivity and processability, as compared to formation of a coating layer for the retardation layer.

Preferably, the slow axis of the first retardation layer is tilted at an angle of −5°, −4°, −3°, −2°, −1°, 0°, +1°, +2°, +3°, +4°, or +5°, specifically −3° to +3°, more preferably 0°, with respect to the light absorption axis (0°) of the first polarizer.

The slow axis of the first retardation layer is substantially in the same direction as the MD of the first retardation layer. Here, 'substantially in the same direction' means that an angle between the slow axis of the first retardation layer and the MD of the first retardation layer is in the range of 0° to 5°, specifically 0° to 3°, more specifically 0°.

In one embodiment, the slow axis of the first retardation layer may be the MD thereof and the fast axis of the first retardation layer may be the TD thereof.

The slow axis of the first retardation layer may be tilted at an angle of +85° to +95°, specifically +90°, with reference to the alignment direction of the liquid crystal molecules of the liquid crystal layer in a non-electric field state and thus may be substantially orthogonal thereto. With this structure, the optical display device can secure the effect of compensation for broad viewing angle.

The first retardation layer includes a positive B retardation layer having a degree of biaxiality of −1 to −0.2 at a wavelength of 550 nm (nz>nx>ny, nx, ny, and nz being the indexes of refraction of the positive B retardation layer at a wavelength of 550 nm in the slow axis direction, the fast axis direction, and the thickness direction thereof, respectively). As a result, the optical display device can achieve good compensation for broad viewing angle through the second retardation layer and the first retardation layer. nz>nx>ny and the degree of biaxiality may be achieved through adjustment of the elongation ratio and the material of the first retardation layer in formation of the first retardation layer.

The first retardation layer may have a degree of biaxiality of, for example, −1, −0.9, −0.8, −0.7, −0.6, −0.5, −0.4, −0.3, or −0.2, specifically −1 to −0.2, more specifically −0.8 to −0.2, at a wavelength of 550 nm. Within this range, the optical display device can achieve compensation for broad viewing angle and thickness reduction thereof.

The first retardation layer 30 may have an in-plane retardation of 50 nm to 110 nm, for example, 50 nm, 55 nm, 60 nm, 65 nm, 70 nm, 75 nm, 80 nm, 85 nm, 90 nm, 95 nm, 100 nm, 105 nm, or 110 nm, specifically 50 nm to 100 nm, more specifically 50 nm to 90 nm, or 60 nm to 90 nm, at a wavelength of 550 nm. Within this range, the optical display device can achieve compensation for broad viewing angle.

The first retardation layer 30 may be a film formed of an optically transparent resin or may include a coating layer formed of a liquid crystalline composition or a non-liquid crystalline composition.

Preferably, the first retardation layer is formed of a material having negative (−) birefringence. Here, the "material having negative birefringence" means a material having a slow axis (axis having an index of refraction (nx) in a direction in which the index of refraction in the in-plane direction becomes the maximum value) in a direction orthogonal to a stretching direction (or alignment direction) after stretching (or after alignment).

As the material having negative birefringence, a resin having negative birefringence may have, for example, a chemical bond or a functional group, such as an aromatic group or a carbonyl group, which exhibits high anisotropy, introduced into side chains of the resin. Specifically, the resin having negative birefringence may include at least one selected from among an acrylic based resin, a styrene based resin, such as a non-modified styrene based resin and a modified styrene based resin, a maleimide based resin, and a fumaric acid ester based resin, without being limited thereto. Here, the "modified styrene based resin" is a styrene resin obtained through modification of a non-modified styrene resin with a typical functional group, which may be selected from among any typical functional groups well-known to those skilled in the art so long as the functional resin does not affect realization of negative (−) birefringence.

In one embodiment, the first retardation layer may include a film produced through TD uniaxial stretching of a non-stretched film including the material having negative birefringence. As a result, the slow axis of the first retardation layer becomes the MD of the first retardation layer, thereby facilitating manufacture of a viewer-side polarizing plate through a roll-to-roll process. In addition, an angle between the light absorption axis of the first polarizer (MD of the first polarizer) and a stretching axis of the first retardation layer (TD of the first retardation layer) is in the range of +85° to +95°, specifically +90°, thereby minimizing generation of curls on the polarizing plate.

TD stretching may be realized by dry stretching or wet stretching through a single stage or multiple stages by a typical method known to those skilled in the art. A TD elongation ratio of the first retardation layer may be suitably adjusted such that the first retardation layer reaches the degree of biaxiality within the above range.

The first retardation layer 30 may have a thickness of greater than 0 μm to 80 μm, specifically 20 μm to 80 μm.

The slow axis of the first retardation layer may be tilted at an angle of +85° to +95°, specifically +90°, with reference to the alignment direction (0°) of the liquid crystal molecules of the liquid crystal layer in a non-electric field state and thus may be substantially orthogonal thereto. With this structure, the effects of the present invention can be efficiently realized.

Although not shown in FIG. 1, an adhesive layer, a bonding layer or an adhesive/bonding layer may be formed between the first polarizer 20 and the first retardation layer 30 to bond the first polarizer to the first retardation layer. The bonding layer may be formed of a water-based bonding agent and/or a photocurable bonding agent, without being limited thereto. The adhesive layer may be formed of a (meth)acrylic adhesive, without being limited thereto. According to the present invention, the first polarizer may be bonded to the first retardation layer through a roll-to-roll process, thereby facilitating treatment of the adhesive layer, the bonding layer or the adhesive/bonding layer.

Although not shown in FIG. 1, the adhesive layer, the bonding layer or the adhesive/bonding layer may be formed on a lower surface of the first retardation layer, whereby the polarizing plate (for example, the viewer-side polarizing plate including the first polarizer and the first retardation layer can be stacked on the optical display panel.

Optical Display Panel

The optical display panel 10 includes an image display medium.

In one embodiment, the optical display panel 10 may include a liquid crystal layer 60 as the image display medium. However, it should be understood that the present invention is not limited thereto.

The liquid crystal layer 60 may include liquid crystal molecules in a horizontal alignment (HA) mode in a non-driven state. The liquid crystal molecules may be evenly aligned parallel to a flat surface of a first substrate or a second substrate.

In one embodiment, the liquid crystal layer may adopt an in-plane switching (IPS) mode or a fringe field switching (FFS) mode as the horizontal alignment (HA) mode. The liquid crystal molecules may be nematic liquid crystals or sematic liquid crystals, without being limited thereto. The liquid crystal molecules may employ positive (+) and negative (+) dielectric anisotropy, without being limited thereto.

The optical display panel 10 may include at least one substrate in order to allow the image display medium including the liquid crystal layer 60 and the second retardation layer 40 to be easily included in the optical display panel.

In one embodiment, referring to FIG. 1, the optical display panel may include a first substrate 11 and a second substrate 12 facing the first substrate 11. Each of the second retardation layer 40 and the liquid crystal layer 60 may be disposed between the first substrate 11 and the second substrate 12.

The first substrate 11 is disposed on the light exit surface of the optical display panel, and functional optical elements for driving the optical display panel and/or image display, such as a color filter, a black matrix, and the like, may be formed on an upper or lower surface of the first substrate.

The second substrate 12 may be disposed on the light incidence surface of the optical display panel. A switching element for controlling electrical and optical properties of liquid crystals may be formed on an upper surface of the second substrate.

Each of the first substrate 11 and the second substrate 12 may be formed of a glass substrate, a transparent plastic film, or a transparent plastic substrate, without being limited thereto.

In one embodiment, the optical display panel includes the second substrate 12, the liquid crystal layer 60, the second retardation layer 40, and the first substrate 11, which are sequentially stacked in the stated order, in which both the liquid crystal layer 60 and the second retardation layer 40 may be disposed in a space defined by the second substrate 12 and the first substrate 11.

In one embodiment, the second retardation layer may be directly formed on a lower surface of the first substrate. Here, "directly formed" means that neither adhesive layer, nor a bonding layer, nor an adhesive/bonding layer is formed between the first substrate and the second retardation layer.

In one embodiment, the liquid crystal layer 60 is formed on a lower surface of the second retardation layer 40 such that the first polarizer 20, the first retardation layer 30, the second retardation layer 40, and the liquid crystal layer 60 are sequentially stacked in the stated order in the optical display panel.

In one embodiment, the second retardation layer 40 may be spaced apart from the liquid crystal layer 60. With this structure, the second retardation layer 40 does not affect the alignment direction or the driving direction of the liquid crystal molecules in the liquid crystal layer 60.

Second Polarizer

The second polarizer 50 is disposed at the other side of the first polarizer 20 (on the light incidence surface of the optical display panel) with reference to the optical display panel 10.

The second polarizer 50 may include a polarizer produced from a polymer film mainly consisting of a polyvinyl alcohol resin. Specifically, the second polarizer may be prepared by dyeing the polymer film with iodine or dichroic dyes, followed by uniaxially stretching in the MD (machine direction). Specifically, the second polarizer may be prepared through swelling, dyeing, stretching and crosslinking of a polyvinyl alcohol film.

The second polarizer 50 may have a thickness of greater than 0 μm to 30 μm, specifically 2 μm to 20 μm, more specifically 4 μm to 10 μm. Within this range, the second polarizer can be used in the polarizing plate.

The second polarizer 50 has a light absorption axis and a light transmission axis. The light absorption axis of the second polarizer may correspond to the machine direction (MD) thereof and the light transmission axis of the second polarizer may correspond to the transverse direction (TD) of the second polarizer.

The light absorption axis of the second polarizer 50 may be tilted at an angle of +85° to +95°, specifically +90°, with reference to the light absorption axis) (0°) of the first polarizer and thus may be substantially orthogonal thereto.

In one embodiment, assuming that the optical display panel has a rectangular shape with a long direction and a short direction, the light absorption axis of the second polarizer may be in the same direction as the short direction of the optical display panel.

Although not shown in FIG. 1, an optically isotropic or anisotropic polarizer protective film or an optically isotropic or anisotropic polarizer protective layer may be further formed on at least one surface of the second polarizer 50. The optically isotropic or anisotropic polarizer protective film and the optically isotropic or anisotropic polarizer protective layer are the same as those described above.

Although not shown in FIG. 1, an adhesive layer, a bonding layer or an adhesive/bonding layer may be formed on an upper surface of the second polarizer 50 or between the second polarizer 50 and the polarizer protective film or the polarizer protective layer to allow a polarizer (for example, a light-source side polarizer) including the second polarizer to be stacked on the optical display panel therethrough.

Alternatively, the second polarizer or the polarizing plate including the same may be omitted depending upon the kind of image display medium in the optical display panel.

Next, an optical display device according to one embodiment of the present invention will be described.

The optical display device includes an optical display module according to one embodiment of the present invention. The optical display device may include a liquid crystal display device, without being limited thereto.

The liquid crystal display device may include an optical display module, a backlight unit, and the like. The backlight unit may be disposed outside the first polarizer or outside the second polarizer. The backlight unit may be manufactured by adopting typical optical elements, such as a light source, a light guide plate, an optical sheet, and the like, well-known to those skilled in the art.

[Mode for Invention]

Next, the present invention will be described in more detail with reference to some examples. However, it should be noted that these examples are provided for illustration only and are not to be construed in any way as limiting the present invention.

Example 1

A polarizer having a light transmittance of 43% was prepared by stretching a polyvinyl alcohol film (PS #60, pre-stretching thickness: 60 µm, Kuraray Co., Ltd.) to 6 times an initial length thereof in the MD in an aqueous solution of iodine at 55° C. The prepared polarizers were used as a first polarizer and a second polarizer. Each of the first polarizer and the second polarizer has a light absorption axis in the same direction as the MD of each of the first polarizer and the second polarizer.

A first retardation layer exhibiting phase retardation as listed in Table 1 was manufactured through TD-uniaxial stretching of a non-stretched film including a negative-birefringence resin (modified styrene based resin) at a predetermined elongation ratio. The slow axis of the first retardation layer is the MD of the first retardation layer.

A viewer-side polarizing plate was prepared by bonding the first retardation layer to a lower surface of the first polarizer corresponding to a light incidence surface of the first polarizer through a roll-to-roll process using a bonding agent, with the absorption axis of the first polarizer disposed parallel to the slow axis of the first retardation layer.

A source-side polarizing plate was prepared by bonding a triacetylcellulose film to a light exit surface of the second polarizer.

A module was prepared by stacking the viewer-side polarizing plate on a light exit surface of a liquid crystal panel (including an FFS liquid crystal layer) including the second retardation layer having phase retardation as listed in Table 1 inside the liquid crystal panel while stacking the light source-side polarizing plate on a light incidence surface of the liquid crystal panel. The viewer-side polarizing plate includes the first retardation layer and the first polarizer sequentially stacked on the liquid crystal panel.

In the module, the light absorption axis of the first polarizer was orthogonal to the light absorption axis of the second polarizer. In the module, the light absorption axis of the first polarizer, the slow axis of the first retardation layer, and the slow axis of the second retardation layer were parallel to one another. In the module, each of the light absorption axis of the first polarizer, the slow axis of the first retardation layer, and the slow axis of the second retardation layer was orthogonal to an alignment direction of liquid crystal molecules in a non-electric field state in the panel.

Examples 2 to 5

Each module was prepared in the same manner as in Example 1 except that retardation of each of the first retardation layer and the second retardation layer was changed as listed in Table 1.

Comparative Example 1

A first polarizer and a second polarizer were prepared in the same manner as in Example 1. A viewer-side polarizing plate was prepared by sequentially stacking a first retardation layer and a second retardation layer to a lower surface of the first polarizer, as listed in Table 1. A module was manufactured by stacking the viewer-side polarizing plate on a light exit surface of a liquid crystal panel (including an FFS liquid crystal layer) while stacking the light source-side polarizing plate on a light incidence surface of the liquid crystal panel. Assuming that the light absorption axis of the first polarizer is 0° in the viewer-side polarizing plate, the slow axis of the first retardation layer is orthogonal to the slow axis of the second retardation layer.

Comparative Examples 2 and 3

Each module was prepared in the same manner as in Example 1 except that the structure of each of the first retardation layer and the second retardation layer was changed as listed in Table 1.

Comparative Example 4

A module was prepared in the same manner as in Example 1 except that the structure of the first retardation layer was changed, as listed in Table 1, and a Bo retardation layer having NZ of 0.8 at a wavelength of 550 nm in Table 1 (nx>nz>ny, nx, ny, and nz being the indexes of refraction of the Bo retardation layer at a wavelength of 550 nm in the slow axis direction, the fast axis direction, and the thickness direction thereof, respectively) was used as the second retardation layer.

Comparative Example 5

A module was prepared in the same manner as in Example 1 except that the structure of the first retardation layer was changed, as listed in Table 1, and a −B retardation layer having NZ of 1.2 at a wavelength of 550 nm in Table 1 (nx>nz>ny, nx, ny, and nz being the indexes of refraction of the −B retardation layer at a wavelength of 550 nm in the slow axis direction, the fast axis direction, and the thickness direction thereof, respectively) was used as the second retardation layer.

Retardation of each of the first retardation layer and the second retardation layer was measured at a wavelength of 550 nm using an AxoScan spectrometer.

The modules prepared in Examples and Comparative Examples were evaluated as to the following properties and evaluation results are shown in Table 1 and FIG. 2.

(1) Roll-to-roll manufacture of viewer-side polarizing plate: Among the modules of Examples and Comparative Examples, a module allowing roll-to-roll manufacture of a viewer-side polarizing plate was rated as 'O' and a module not allowing roll-to-roll manufacture of the viewer-side polarizing plate was rated as 'X'.

(2) Broad viewing angle: Broad viewing angle was evaluated using each module prepared in each of Examples and Comparative Examples using Techwiz 1D optical simulation program (SANAYI System, KR). As measured excluding a color filter, BM (black matrix) and an electrode, a module having a maximum omnidirectional transmittance (unit: %) of less than 0.5% was rated as "good", a module having a maximum omnidirectional transmittance (unit: %) of 0.5% to less than 1.0% was rated as "poor", and a module having a maximum omnidirectional transmittance (unit: %) of 1.0% or more was rated as "very poor". A lower maximum omnidirectional transmittance indicates better broad viewing angle.

As shown in Table 1 and FIG. 2, the optical display module according to the present invention includes a viewer-side polarizing plate produced through a roll-to-roll process, thereby enabling improvement in processability and productivity while securing good compensation for broad viewing angle.

Conversely, as shown in Table 1 and FIG. 2, the module of Comparative Example 1 including the laminate of the first polarizer, the +A layer and the +B layer as the viewer-side polarizing plate had low processability and productivity while providing poor compensation for broad viewing angle due to difficulty in fabrication of the viewer-side polarizing plate through a roll-to-roll process.

In addition, as shown in Table 1 and FIG. 2, the module of Comparative Example 2 not having the structures of the first retardation layer and the second retardation layer according to the present invention had low processability and productivity while providing poor compensation for broad viewing angle due to difficulty in fabrication of the viewer-side polarizing plate through a roll-to-roll process, and the modules of Comparative Examples 3 to 5 could not be used due to poor compensation for broad viewing angle.

It should be understood that various modifications, changes, alterations, and equivalent embodiments can be made by those skilled in the art without departing from the spirit and scope of the present invention.

The invention claimed is:

1. An optical display module comprising: an optical display panel; and a first polarizer, a first retardation layer and a second retardation layer sequentially stacked, wherein the first retardation layer and the second retardation layer are configured together as an optical compensation structure;

wherein the optical display panel comprises a layer comprising an image display medium, and wherein the second retardation layer is directly formed on an inner substrate of the optical display panel coated on a surface inside the optical display panel and has a thickness of 0.5 μm to 2 μm;

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| First retardation layer | Optical characteristics | +B | +B | +B | +B | +B | +A | +B | +B | +B | +B |
| | NZ | −0.2 | −0.4 | −0.6 | −0.8 | −1.0 | 1 | −0.2 | −1.2 | −0.6 | −0.6 |
| | Re (nm) | 80 | 70 | 60 | 60 | 50 | 80 | 80 | 40 | 120 | 120 |
| | Angle 1 (°) | 0 | 0 | 0 | 0 | 0 | 90 | 90 | 0 | 0 | 0 |
| Second retardation layer | Optical characteristics | +A | +A | +A | +A | +A | +B | +A | +A | Bo | −B |
| | NZ | 1 | 1 | 1 | 1 | 1 | −1 | 1 | 1 | 0.8 | 1.2 |
| | Re (nm) | 90 | 100 | 110 | 110 | 120 | 90 | 90 | 70 | 70 | 120 |
| | Angle 2 (°) | 0 | 0 | 0 | 0 | 0 | 90 | 0 | 0 | 0 | 0 |
| Roll-to-roll manufacture | | O | O | O | O | O | X | X | O | O | O |
| Maximum omnidirectional transmittance | | 0.18 | 0.15 | 0.16 | 0.20 | 0.16 | 1.69 | 2.01 | 0.80 | 1.98 | 2.40 |
| Broad viewing angle | | Good | Good | Good | Good | Good | Very poor | Very poor | Poor | Very poor | Very poor |

\* Angle 1: Angle of the slow axis of the first retardation layer with respect to the light absorption axis (0°) of the first polarizer
\*Angle 2: Angle of the slow axis of the second retardation layer with respect to the light absorption axis (0°) of the first polarizer a slow axis of the first retardation layer and a slow axis of the second retardation layer are each aligned at 0° with respect to a light absorption axis of the first polarizer;

the second retardation layer comprises a positive A retardation layer having a degree of biaxiality (NZ) of 1.0 and an in-plane retardation (Re) of 90 nm to 110 nm at a wavelength of 550 nm; and the first retardation layer comprises a positive B retardation layer having a degree of biaxiality (NZ) of −0.6 to −0.2 and an in-plane retardation (Re) of 60 nm to 80 nm at a wavelength of 550 nm, wherein the first retardation layer is formed of a material having negative (−) birefringence, wherein the material having negative (−) birefringence comprises at least one selected from among a non-modified styrene based resin, a modified styrene based resin, a maleimide based resin, and a fumaric acid ester based resin, wherein the first retardation layer comprises a film comprising a cyclic olefin polymer or a cyclic olefin copolymer and subjected to TD uniaxial stretching.

2. The optical display module according to claim 1, wherein each of the first polarizer and the first retardation layer is disposed outside the optical display panel.

3. The optical display module according to claim 1, wherein the slow axis of the first retardation layer is tilted at an angle of 0° to 5° with respect to a machine direction (MD) of the first retardation layer.

4. The optical display module according to claim 1, wherein the first retardation layer comprises a film comprising the material having negative (−) birefringence and subjected to TD uniaxial stretching.

5. The optical display module according to claim 1, further comprising:

an adhesive layer, a bonding layer or an adhesive/bonding layer between the first polarizer and the first retardation layer.

6. The optical display module according to claim 1, wherein the second retardation layer is formed of a liquid crystalline composition containing a reactive mesogen.

7. The optical display module according to claim 1, wherein the image display medium comprises a liquid crystal layer.

8. The optical display module according to claim 7, wherein the slow axis of the second retardation layer is tilted at an angle of +85° to +95° with reference to an alignment direction of liquid crystal molecules in a non-electric field state in the liquid crystal layer.

9. The optical display module according to claim 7, wherein an alignment direction of liquid crystal molecules in a non-electric field state in the liquid crystal layer is tilted at an angle of +85° to +95° with reference to the light absorption axis of the first polarizer.

10. The optical display module according to claim 7, wherein, the first polarizer, the first retardation layer, the second retardation layer, and the liquid crystal layer are sequentially formed in the stated order.

11. The optical display module according to claim 7, wherein the liquid crystal layer comprises liquid crystals in a horizontal alignment mode.

12. The optical display module according to claim 1, further comprising:

a second polarizer disposed at an opposite side to the first polarizer with reference to the optical display panel, wherein a light absorption axis of the second polarizer is tilted at an angle of +85° to +95° with reference to the light absorption axis of the first polarizer.

13. An optical display device comprising the optical display module according to claim 1.

14. The optical display module according to claim 1, wherein the second retardation layer is spaced apart from and adjacent the layer comprising the image display medium.

* * * * *